(12) United States Patent
Bogner et al.

(10) Patent No.: US 12,515,741 B2
(45) Date of Patent: Jan. 6, 2026

(54) TURN ASSISTANT IN A VEHICLE

(71) Applicant: Bayerische Motoren Werke Aktiengesellschaft, Munich (DE)

(72) Inventors: Andreas Bogner, Oberschleissheim (DE); Martin Jaensch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1178 days.

(21) Appl. No.: 17/270,738

(22) PCT Filed: Aug. 21, 2019

(86) PCT No.: PCT/EP2019/072408
§ 371 (c)(1),
(2) Date: Feb. 23, 2021

(87) PCT Pub. No.: WO2020/043575
PCT Pub. Date: Mar. 5, 2020

(65) Prior Publication Data
US 2021/0197896 A1  Jul. 1, 2021

(30) Foreign Application Priority Data
Aug. 28, 2018 (DE) ............ 10 2018 214 551.2

(51) Int. Cl.
*B62D 15/02* (2006.01)
*B60Q 5/00* (2006.01)
(Continued)

(52) U.S. Cl.
CPC .......... *B62D 15/029* (2013.01); *B60Q 5/006* (2013.01); *B60Q 9/005* (2013.01); *B60Q 9/008* (2013.01);
(Continued)

(58) Field of Classification Search
CPC ........ B62D 15/029; B62D 6/00; B60Q 5/006; B60Q 9/005; B60Q 9/008; B60W 30/09;
(Continued)

(56) References Cited

U.S. PATENT DOCUMENTS 9,274,525 B1 *  3/2016  Ferguson ............ G01S 7/52004
10,372,130 B1 *  8/2019  Kaushansky ......... B60W 50/14
(Continued)

FOREIGN PATENT DOCUMENTS

CN  103477377 A  12/2013
CN  106114357 A  11/2016
(Continued)

OTHER PUBLICATIONS

Meaning of "in particular" definition (Year: 2000).*
(Continued)

*Primary Examiner* — Sohana Tanju Khayer
(74) *Attorney, Agent, or Firm* — Crowell & Moring LLP

(57) ABSTRACT

A method is provided for driver assistance in order to avoid a collision of a bodywork side on an inside of a curve, or of a rear wheel on the inside of the curve, with an obstacle in a turning direction of a motor vehicle. The method creates an environment model that specifies an immediate environment of the motor vehicle together with potential obstacles in the turning direction; measures a steering-angle of the motor vehicle; creates a prospective driving trajectory of the motor vehicle as a function of the measured steering-angle; and outputs a warning function when the prospective driving trajectory indicates a probable contact of the motor vehicle with at least one obstacle.

10 Claims, 1 Drawing Sheet

(51) Int. Cl.
*B60Q 9/00* (2006.01)
*B60W 30/09* (2012.01)
*B60W 50/14* (2020.01)
*B62D 6/00* (2006.01)

(52) U.S. Cl.
CPC ............ *B60W 30/09* (2013.01); *B60W 50/14* (2013.01); *B62D 6/00* (2013.01)

(58) Field of Classification Search
CPC ............ B60W 50/14; B60W 2300/14; B60W 2554/00; B60W 30/0953; B60W 30/0956; B60W 2540/18; B60W 30/18145
See application file for complete search history.

(56) References Cited

U.S. PATENT DOCUMENTS

| | | | | |
|---|---|---|---|---|
| 11,498,577 | B2 * | 11/2022 | Kamata | G05D 1/0274 |
| 2013/0124041 | A1 | 5/2013 | Belser et al. | |
| 2013/0338877 | A1 * | 12/2013 | Straus | G08G 1/161 701/41 |
| 2017/0057496 | A1 * | 3/2017 | Toyoda | G05D 1/0289 |
| 2017/0101056 | A1 * | 4/2017 | Park | G08G 1/04 |
| 2017/0217430 | A1 * | 8/2017 | Sherony | B60W 10/04 |
| 2017/0334460 | A1 * | 11/2017 | Arakawa | B60W 30/18163 |
| 2018/0257645 | A1 * | 9/2018 | Buburuzan | G07C 5/008 |
| 2018/0268695 | A1 * | 9/2018 | Agnew | B60K 28/06 |
| 2018/0284787 | A1 * | 10/2018 | Naka | G01S 13/00 |
| 2019/0061764 | A1 * | 2/2019 | Tokuhiro | G05D 1/0246 |
| 2019/0259283 | A1 * | 8/2019 | Sung | B60Q 9/008 |
| 2020/0302780 | A1 * | 9/2020 | Awai | B60W 60/0016 |
| 2021/0300401 | A1 * | 9/2021 | Hashimoto | G08G 1/166 |

FOREIGN PATENT DOCUMENTS

| | | |
|---|---|---|
| DE | 103 07 229 A1 | 4/2004 |
| DE | 10 2006 004 866 A1 | 8/2007 |
| DE | 102008036009 A1 * 10/2009 ......... B62D 15/0265 |
| DE | 10 2009 032 542 A1 | 1/2011 |
| DE | 10 2010 002 105 A1 | 8/2011 |
| DE | 10 2010 023 164 A1 | 12/2011 |
| DE | 10 2014 208 006 A1 | 11/2015 |
| DE | 10 2016 117 712 A1 | 3/2018 |
| DE | 10 2017 103 132 A1 | 8/2018 |
| EP | 2 788 968 B1 | 8/2015 |
| WO | WO 2013/083384 A1 | 6/2013 |

OTHER PUBLICATIONS

Cover Page of EP 2 788 968 A1 published Oct. 15, 2014 (one (1) page).
International Search Report (PCT/ISA/210) issued in PCT Application No. PCT/EP2019/072408 dated Jan. 15, 2020 with English translation (six (6) pages).
Japanese-language Written Opinion (PCT/ISA/237) issued in PCT Application No. PCT/EP2019/072408 dated Jan. 15, 2020 (six (6) pages).
German-language Search Report issued in German Application No. 10 2018 214 551.2 dated May 16, 2019 with partial English translation (13 pages).
Chinese-language Office Action issued in Chinese Application No. 201980055808.0 dated Apr. 27, 2023 with partial English translation (14 pages).
Cover Page of EP 2 788 968 A1 published Oct. 15, 2014 (1 page).

* cited by examiner

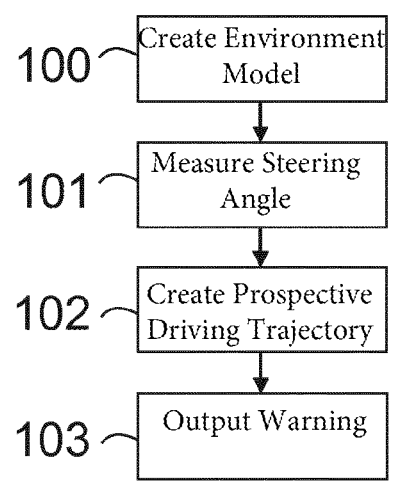

TURN ASSISTANT IN A VEHICLE

BACKGROUND AND SUMMARY OF THE INVENTION

The invention relates to a method for assisting a driver in the course of a turning procedure, particularly in the case of especially tight curves. There is the danger here of a lateral collision in the course of tight cornering. The present invention further relates to an appropriately adapted system arrangement. In addition to this, a computer-program product is proposed having control commands that implement the method and operate the proposed system arrangement.

DE 10 2009 032 542 A1 discloses a method for operating a driver-assistance system of a vehicle, which system captures a position of an object in the environment of a vehicle with the aid of sensors, and calculates therefrom the distance between the object and the vehicle.

DE 10 2014 208 006 A1 discloses a method for capturing the ambient field of a vehicle, wherein a map of the surroundings of the vehicle is created, wherein capture-zone data of at least one sensor system—in particular, a radar system, a laser system, an ultrasound system, or a camera system, in particular an optical or infrared system—are received.

DE 10 2006 004 866 B4 discloses a driver-assistance system for a vehicle, which system features a first sensor device for capturing an object in a blind-spot zone of the vehicle. In addition to this, the invention also relates to a method for operating a vehicle, in which objects that are located in a blind-spot zone of the vehicle can be captured by means of a first sensor device.

EP 2 788 968 B1 discloses a method for active warning for the purpose of avoiding a collision of a vehicle body part and/or of a vehicle wheel with at least one curbstone and/or with another similar object, and a vehicle-assistance system for carrying out the method according to the invention.

Present-day driver-assistance functions support the driver in the cognition of his/her driving task. This support is given in diverse ways. For instance, there are driver-assistance functions that support the driver, via visual and/or acoustic channels, in avoiding a collision with other road-users or with existing curbstone edges, for example in the course of a parking procedure. A further possibility for driver support is the use of a vibration of the steering-wheel which warns the driver of an impending collision with the following and/or overtaking traffic when leaving a lane or when changing lane. Likewise, there are driver-assistance functions that support the driver by active intervention in the brake, the drive and the steering in the course of the longitudinal and lateral guidance of the vehicle. With respect to avoiding a collision with the infrastructure—for example, curbstone edges or parked vehicles—the focus is currently on parking procedures within a limited, low-speed range. Moreover, there are ideas that support the driver in the course of turning procedures, in order to avoid collisions with moving road-users such as cyclists or pedestrians, for example.

At the present time there are no driver-assistance functions that support the driver in situations outside of parking procedures in avoiding a collision with the infrastructure—for example, curbstone edges—or with parked vehicles. But a support for the driver is oftentimes sensible—for example, in the course of turning on tight curves—in order to avoid damage to one's own vehicle and to other people's vehicles and also to the infrastructure.

It is an object of the present invention to provide an improved—in particular, more reliable—method for driver assistance in the course of tight curves. Furthermore, it is an object of the present invention to provide an appropriately adapted system arrangement, and also to propose a computer-program product having control commands that implement the method or at least partially operate the proposed system arrangement.

The object is achieved by a method with the features according to the independent claims. Further advantageous configurations are indicated in the dependent claims.

Accordingly, a method is provided for driver assistance for the purpose of avoiding a collision of a bodywork side on the inside of a curve, or of a rear wheel on the inside of a curve, with obstacles in a direction of turn of a motor vehicle, featuring creation of an environment model that specifies the immediate environment of the vehicle together with potential obstacles in the direction of turn, wherein the following are provided: measurement of a steering-angle of the motor vehicle; creation of a prospective driving trajectory of the motor vehicle as a function of the measured steering-angle; and output of a warning function if the prospective driving trajectory comes into contact with at least one obstacle.

The method according to the invention serves for avoiding a collision on the inside of the vehicle, particularly in the course of tight cornering. In this regard, conventional driver-assistance systems are restricted to application scenarios in which the vehicle is driving straight ahead or merely executing minor steering movements. In accordance with the invention, an environment model is created that refers, in particular, to the direction of the vehicle in which the vehicle is turning. Consequently, in accordance with the invention it is not necessary to create an environment model that identifies obstacles all around the vehicle. A specialized method is therefore proposed, and the advantage arises that fewer data accumulate which then have to be processed.

The environment model can be created on the basis of various sensors which include optical sensors such as a camera, for instance. However, in this connection a person skilled in the art is also familiar with further sensors—such as, for instance, radar or acoustic sensors—on the basis of which the environment model can be created. It is particularly advantageous to create an environment model that also includes low obstacles such as a curb, for instance. Even though no direct danger for the safety of the driver comes oftentimes from a curb, nevertheless considerable damage may occur to the tires or rims, and the driver is oftentimes scared by the collision and accordingly distracted from the road traffic. A further consequence is that the trajectory of the vehicle may change as a result of the impulse on the wheel, and there is the danger of a consequential accident.

Consequently the proposed method relates both to static obstacles such as a curb, for instance, and to dynamic obstacles such as a cyclist. Potential obstacles are any obstacles that are located in the direction of turn of the vehicle. Further data—such as navigation data, for instance—may be combined for the purpose of creating the environment model. In this way, the prospective trajectory of the vehicle can also be estimated additively on the basis of navigation data.

For the purpose of estimating the trajectory, the behavior of the driver is preferably analyzed, and then the trajectory is predicted also on the basis of a current steering movement. If, in addition to this, the driver has entered data into a navigation system, then on the basis of such data it is also possible to foresee how the driver will foreseeably drive, and the trajectory can be created not only on the basis of the steering movements.

The proposed system is able to measure the steering-angle and, in addition to this, match it with further data. In this way, it is possible for the system to recognize that the vehicle is to be found on this route fairly often, and previous journeys can thereupon be included in the calculation of the trajectory. In this way, on the basis of GPS data it can be ascertained how the driver typically enters a tight curve, and it can then be estimated how he/she will proceed in the course of the current journey. High-resolution navigation data preferentially find application in this connection.

The estimated trajectory of the vehicle is inserted into the environment model in such a manner that it is possible to foresee whether or not the vehicle will come into contact with an obstacle. For this purpose, the dimensions of the vehicle (or the vehicle geometry), which can be saved in the system in advance, are taken into account. In this way, by means of a data memory the manufacturer can provide particulars about the dimensions of the vehicle, which are then processed by the method according to the invention. Consequently the advantage arises that it is possible to calculate for each vehicle individually whether or not a collision with an obstacle is impending.

In addition to this, the probability on the basis of which an obstacle will be contacted can be calculated, and a warning function can be chosen accordingly. In the case of a high probability, the intensity and number of the warning functions can be varied. In this way, in the case of a high probability several warning functions can be triggered, and these may be correspondingly severe. In this way, an acoustic signal can be output particularly loudly or, for instance, a vibration of the steering-wheel may be particularly severe. If a collision is rather unlikely, a quiet noise can be output, or merely a slight vibration can be triggered.

It is also possible that a collision with several obstacles is impending and, accordingly, various warning functions can also be output. In this way, the driver can specify that a certain combination of warning functions will be triggered in the event of a collision with several obstacles. The warning function can also be specified on the basis of the collision direction. A motor vehicle is typically equipped with several loudspeakers in the passenger compartment of the vehicle, and consequently loudspeakers are able to indicate the direction in which a collision is impending. If, for instance, a frontal collision is impending with a side collision, the loudspeakers can be activated appropriately.

A driver-assistance function is provided that supports the driver in situations outside of parking procedures—for example, in the course of turning on tight curves—in avoiding a collision with the infrastructure—for example, curbstones—or with parked vehicles. In an upgrade, the support is intended to be extended also to journeys with a trailer.

The danger of a lateral collision in the course of tight cornering is to be attributed to the fact that, by virtue of the kinematics of the vehicle, the rear axle travels along a curve radius in the course of cornering that is different from the one traveled along by the front axle. As a result, a collision of the bodywork side on the inside of a curve, or of the rear wheel on the inside of a curve, may occur with obstacles around which the front axle has driven without difficulty.

The basis of the method is constituted by the lateral detection of collision-critical objects by the environment model. These objects may be—besides relatively large obstacles such as, for example, other vehicles or street lamps—also distinctly lower objects such as curbstones, driving over which may result in damage to the tires or to the floor of the vehicle. Objects that are located in the immediate vicinity of the vehicle are exclusively relevant to the method.

In parallel, via a vehicle model—for example, with reference to a two-lane model—the exact kinematics of the vehicle have to be predicted on the basis of the steering-angle. As a result, a check for overlaps of the outline of the vehicle with the objects selected from the environment model can take place, in order in this way to predict potential collisions. In the calculation of the kinematics, variable influencing factors also have to be taken into account that would result in alterations of the kinematics—for example, an alteration of the steering-angle by the driver. A single-lane model in combination with further vehicle-geometry variables may be sufficient in the present case.

If an impending collision was identified by the inspection described above, the driver can subsequently be supported appropriately. By reason of the varying degree of complexity with respect to the requisite quality of detection of the surrounding vehicle environment and the predicted motion of one's own vehicle (in an upgrade, inclusive of a trailer), this support can be given in several stages in scalable manner. The support includes, for instance, a visual warning of the driver in the event of an impending collision with the infrastructure or with parked vehicles, an extension of the warning by a vibration of the steering-wheel and/or an extension of the warning by acoustic elements as well as an active intervention in the longitudinal and/or lateral guidance.

The invention extends the support of the driver within the urban realm. Particularly in the course of turning on tight curves, the invention assists in avoiding damage to one's own vehicle and to other people's vehicles, as well as to the infrastructure. This application has not yet been covered by driver-assistance systems currently available.

In the following, aspects will be presented, in some cases, with reference to electrically driven vehicles; however, this is not to be interpreted as being restrictive. Rather, the present invention is directed in general both toward electric vehicles and toward vehicles with an internal-combustion engine. To this extent, in accordance with the invention motor vehicles are generally developed further. In this connection, generally any motor vehicle enters into consideration by way of motor vehicle, in particular an automobile or a motorcycle. The present invention can also be employed in motor vehicles with a hybrid drive.

According to one aspect of the present invention, the creation of the prospective driving trajectory is undertaken on the basis of a single-lane model or a two-lane model, or in general on the basis of a vehicle model. This has the advantage that the single-lane model yields a particularly efficient model of a trajectory and can consequently be processed particularly efficiently. Hence fewer data accumulate at run-time, and a warning function can be triggered in real time. The two-lane model is oftentimes more accurate and is suitable for systems that are equipped with appropriate hardware capacities, since larger amounts of data accumulate. In accordance with the invention, any model of vehicle may find application.

According to a further aspect of the present invention, the creation of the prospective driving trajectory takes the dimensions of the vehicle into account. This has the advantage that an individual trajectory can be used for each vehicle, and consequently the dimensions of relatively large transport vehicles can also be taken into account. Oftentimes the problem arises—for instance, in the case of transport vehicles that are rented—that the driver is unable to assess the new vehicle with respect to its dimensions. In accordance with the invention, this disadvantage is eliminated.

According to a further aspect of the present invention, the creation of the prospective driving trajectory takes a prospective steering behavior of a driver into account. This has the advantage not only that the current steering-angle can be taken into account but that machine learning can be employed, and on the basis of past steering behaviors it can be predicted how the driver will foreseeably react. In this way, other vehicles can also supply measurement data, and these data can be provided to the vehicle that is executing the method according to the invention.

According to a further aspect of the present invention, the creation of the environment model is undertaken by means of optical sensors. This has the advantage that an accurate and current image of the environment can be created. However, the present invention is not restricted to optical sensors.

According to a further aspect of the present invention, the creation of the environment model includes an identification of moving obstacles, the trajectory of motion of which is taken into account. This has the advantage that dynamic obstacles—such as cyclists, for instance—can also be identified, and the trajectory thereof can be predicted. In this way, not only static obstacles but also dynamic obstacles are accordingly taken into account. In this connection, a person skilled in the art is familiar with further obstacles that move, such as a pedestrian or animals, for instance.

According to a further aspect of the present invention, the output of the warning function includes an output of a visual warning, a vibration—for example, of the steering-wheel—and/or an output of an acoustic warning. This has the advantage that conventional output instruments can be re-used, and the driver receives a freely configurable warning function. In particular, the warning function can be provided by means of several output instruments, and it may vary in its intensity. Consequently a particularly intuitive warning is given, and the driver is distracted as little as possible from the road traffic.

According to a further aspect of the present invention, the output of the warning function includes an active intervention in a longitudinal guidance and/or a lateral guidance of the vehicle. This has the advantage that a collision can be avoided by means of an active guidance of the vehicle, and, for instance, the driver can be supported even if he/she does not see the corresponding obstacle at all. Accordingly, a cyclist may be located in a blind spot, and the driver would oftentimes not know where the collision is impending. The method according to the invention identifies cyclists and can actively countersteer or decelerate the vehicle. An intervention in the transverse and/or longitudinal guidance may also be carried out without a visual, haptic or acoustic warning.

The object is also achieved by a system arrangement for driver assistance for the purpose of avoiding a collision of a bodywork side on the inside of a curve, or of a rear wheel on the inside of a curve, with obstacles in a direction of turn of a motor vehicle, featuring at least one sensor unit which has been set up to create an environment model that specifies the immediate environment of the vehicle together with potential obstacles in the direction of turn, wherein the following are provided: a measuring unit which has been set up to measure a steering-angle of the motor vehicle; an arithmetic logic unit which has been set up to create a prospective driving trajectory of the motor vehicle as a function of the measured steering-angle; and an interface unit which has been set up to output a warning function if the prospective driving trajectory comes into contact with at least one obstacle. The warning function may also include an intervention in the longitudinal and/or lateral guidance.

The object is also achieved by a computer-program product with control commands that execute the method and operate the proposed arrangement when they are caused to be executed in a computer.

In accordance with the invention, it is particularly advantageous that the method can be used for operating the proposed appliances and units or, to be more exact, the system arrangement. Furthermore, the proposed appliances and devices are suitable for executing the method according to the invention. Consequently, in each instance the appliance implements structural features that are suitable to execute the corresponding method. The structural features may, however, also be configured as method steps. The proposed method also provides steps for realizing the function of the structural features.

Further advantages, features and particulars of the invention arise out of the following description, in which aspects of the invention are described in detail with reference to the drawings. In this connection, the features mentioned in the claims and in the description may be essential to the invention, in each instance individually on their own or in any combination. Similarly, the features stated above and those set forth here in more detail may find application, each on its own or severally in any combinations. The embodiments shown and described are not to be understood as definitive but rather have exemplary character for the purpose of elucidating the invention. The detailed description serves for the information of a person skilled in the art; therefore known circuits, structures and methods will not be shown or elucidated in detail in the description, in order not to render comprehension of the present description difficult.

BRIEF DESCRIPTION OF THE DRAWING

FIG. 1 is a schematic flowchart of a method for driver assistance for the purpose of avoiding a collision, according to one aspect of the present invention.

DETAILED DESCRIPTION OF THE DRAWING

FIG. 1 shows, in a schematic flowchart, a method for driver assistance for the purpose of avoiding a collision of a bodywork side on the inside of a curve, or of a rear wheel on the inside of a curve, with obstacles in a direction of turn of a motor vehicle, featuring creation 100 of an environment model that specifies the immediate environment of the vehicle together with potential obstacles in the direction of turn, wherein the following are provided: measurement 101 of a steering-angle of the motor vehicle; creation 102 of a prospective driving trajectory of the motor vehicle as a function of the measured steering-angle; and output 103 of a warning function if the prospective driving trajectory comes into contact with at least one obstacle. The warning function may also include an intervention in the longitudinal and/or lateral guidance.

In this connection, a person skilled in the art will recognize that the steps may feature further sub-steps, and, in particular, that the steps of the method may each be executed iteratively and/or in a different order. The creation of the environment model may be undertaken iteratively and dynamically in such a manner that a current environment model is built up successively. In this way, the vehicle can approach a point and register it, already during the journey, by means of optical sensors. The creation of the prospective trajectory is also undertaken repeatedly in such a manner that a current trajectory is always available. The output of the warning function may occur until such time as the hazardous situation has been resolved. The warning function may also include an intervention in the longitudinal and/or lateral guidance.

Not shown in the present case is a data memory or a computer-readable medium with a computer-program product featuring control commands that implement the proposed method or operate the proposed system arrangement when they are caused to be executed in a computer.

What is claimed is:

1. A method for driver assistance in order to avoid a collision of a bodywork side on an inside of a curve, or of a rear wheel on the inside of the curve, with an obstacle in a turning direction of a motor vehicle, the method comprising:
    creating an environment model that specifies an immediate environment of the motor vehicle together with potential obstacles only in the turning direction;
    measuring a steering-angle of the motor vehicle;
    creating a prospective driving trajectory of the motor vehicle as a function of the measured steering-angle; and
    outputting a warning function when the prospective driving trajectory indicates a probable contact of the motor vehicle with at least one obstacle.

2. The method according to claim 1, wherein
    the creation of the prospective driving trajectory is undertaken on the basis of a vehicle model.

3. The method according to claim 1, wherein
    the creation of the prospective driving trajectory takes dimensions of the motor vehicle into account.

4. The method according to claim 1, wherein
    the creation of the prospective driving trajectory takes a prospective steering behavior of a driver into account.

5. The method according to claim 1, wherein
    the creation of the environment model is undertaken by way of optical sensors.

6. The method according to claim 1, wherein
    the creation of the environment model includes an identification of moving obstacles whose trajectory of motion is taken into account.

7. The method according to claim 1, wherein
    the output of the warning function includes an output of a visual warning, a vibration, and/or an acoustic warning.

8. The method according to claim 1, wherein
    the output of the warning function includes an active intervention in a longitudinal guidance and/or a lateral guidance of the vehicle.

9. A system arrangement for driver assistance in order to avoiding a collision of a bodywork side on an inside of a curve, or of a rear wheel on the inside of the curve, with an obstacle in a turning direction of a motor vehicle, comprising:
    at least one sensor configured to create an environment model that specifies an immediate environment of the motor vehicle together with potential obstacles only in the turning direction;
    a computer comprising:
        a measuring unit configured to measure a steering-angle of the motor vehicle;
        an arithmetic logic unit configured to create a prospective driving trajectory of the motor vehicle as a function of the measured steering-angle; and
        an interface configured to output a warning function when the prospective driving trajectory indicates probable contact of the motor vehicle with at least one obstacle.

10. A computer product comprising a non-transitory computer-readable medium having stored thereon program code which, when executed on a processor, carries out the acts of:
    creating an environment model that specifies an immediate environment of the motor vehicle together with potential obstacles only in the turning direction;
    measuring a steering-angle of the motor vehicle;
    creating a prospective driving trajectory of the motor vehicle as a function of the measured steering-angle; and
    outputting a warning function when the prospective driving trajectory indicates a probable contact of the motor vehicle with at least one obstacle.

* * * * *